United States Patent Office 3,420,612
Patented Jan. 7, 1969

3,420,612
SAFETY DEVICES FOR LIQUID FUEL HEATERS
Arthur W. Richardson, New Malden, England, assignor to Karma (New Malden) Limited
Filed Oct. 25, 1966, Ser. No. 589,282
Claims priority, application Great Britain, Oct. 25, 1965, 45,166/65
U.S. Cl. 431—33                    13 Claims
Int. Cl. F24c 5/16

ABSTRACT OF THE DISCLOSURE

A heating appliance utilizing liquid fuel in which provision is made for delivering water into the combustion zone of the appliance if the appliance is overset so as to form a flame extinguishing vapor within the combustion zone by contact of the water with hot surfaces defining or within the combustion zone.

The invention relates to liquid fuel burning devices, for example, domestic space heaters, cookers and hurricane lamps for burning fuels such as hydrocarbons, usually kerosene or paraffin, and also alcoholic fuels, and mixtures thereof.

If such a device is overturned or tilted through a large angle whilst alight, there is a danger that the flame will spread outside the burner of the device and ignite any fuel that has escaped. The risk of fire spreading to nearby combustible material is thus very great, particularly if any fuel has been spilled. This fire danger can be minimised by preventing or reducing leakage of the fuel, but it is the major object of the present invention to provide for the flame to be promptly extinguished. It will be appreciated that the invention can be applied in conjunction with means for preventing fuel leakage or reducing spilling, for example, of the kind described in connection with a multiwick burner in my U.S. Patent No. 3,316,956.

The invention accordingly provides a liquid-fuel burning appliance having a container for flame extinguishing material, the container having at least one outlet positioned to discharge the material to extinguish the flame on tilting of the appliance from a normal position through more than a predetermined angle.

The invention also provides a burner for a liquid fuel burning appliance for example a domestic heater, the burner having mounted thereon a container for a flame extinguishing material, the container having outlet means for discharging the material to extinguish the flame of an appliance of which the burner forms part, on tilting thereof through more than a predetermined angle.

By flame extinguishing material is meant such materials which are capable of flow, fluent solid materials such as powders being included as well as fluids, of which water is a convenient example. The material is arranged to be discharged either under atmospheric or higher pressure as by spring-loaded means as near as possible to the flame, for example, on the top of the fuel trough or burner seating, preferably at the hottest part. Any suitable container and discharge means for the fluent material can be employed, for example, water can be held in a tank above or around the burner with one or more outlet pipes leading to above the burner or to the burner seating. The level of the water is normally below the pipe inlets but will reach them and flow to the burner when the appliance is knocked over or tilted through more than a certain angle.

By way of example, and not as limitation, embodiments of the invention, are described below with reference to the accompanying drawings, in which.

Figure 1:
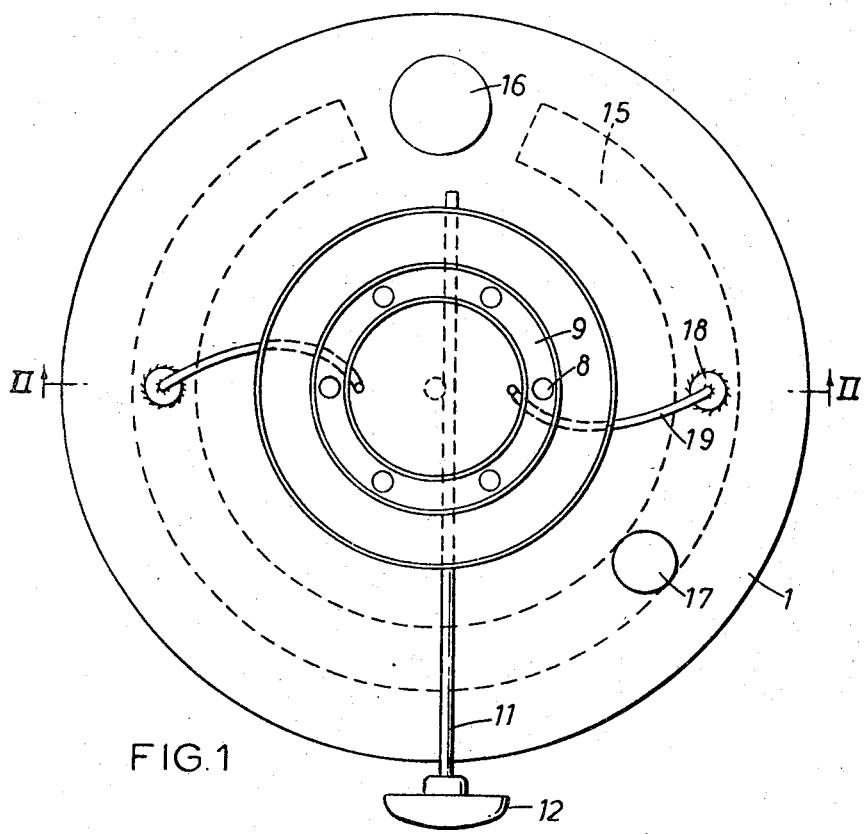
FIGURES 1 and 2 are plan and sectional side views of a liquid fuel burning heater embodying the invention, FIGURE 2 being taken on line II—II of FIGURE 1.
Figure 2:
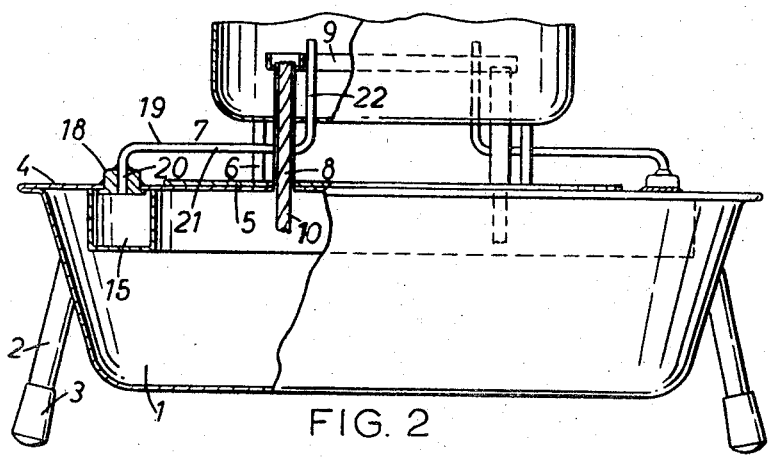

The embodiment of the invention shown in FIGURES 1 and 2 comprises a domestic space heater having a burner of the short drum or perforated shell or sleeve type.

The heater comprises a fuel tank 1 which is circular in plan and has a downwardly tapering frusto-conical side wall. The tank is supported on legs 2 with rubber feet 3 and has a flat top 4 on which is mounted a burner structure. The burner structure comprises a base plate 5 from which a plurality of pillars 6 upstand to support the floor of an outer air shield or draught bowl 7 which surrounds the actual burner. The air shield includes a tubular upper section which ends in an oblique plane at which it connects an aperture in a bowl shaped reflector (not shown). The outer air shield 7 co-operates with an imperforate tubular inner air shield between it and the perforated burner shells to balance out downdraughts.

Six tubes 8 provide passages extending through the top wall 4, the base plate 5, the floor of the draught bowl 7 and the floor of an annular trough 9 which the tubes support. The two concentric tubular preforated burner shells (not shown) stand in this trough and define with the trough floor the burner combustion zone or chamber. Each of the tubes 8 has therewithin a wick 10 mounted in a wick tube for longitudinal sliding. The wicks extend downwardly so that their lower ends dip into the fuel in the tank 1 and the wick tubes are arranged to be movable up and down together, to adjust the level of the wick upper ends within the trough 9, by means of a mechanism is operated through a shaft 11 by a hand wheel 12. A suitable mechanism is described in my U.S. Patent No. 3,316,956. The wick tubes are preferably seated within the tubes 8 in the manner described in my U.S. Patent No. 3,316,956.

In accordance with the invention, the heater incorporates means whereby overturning or extreme tilting will result in extinction of the flame. Accordingly, a container 15 for a flame extinguishing material is provided beneath the top plate 4 of the tank 1. The container 15 is in the form of a generally annular trough secured beneath the top plate 4 by welding and is generally square in radial cross-section. As shown in FIGURE 1, the annular form of the container is not quite complete, a break being provided to accommodate a filler cap 16 whereby liquid fuel can be introduced into the tank 1. The container 15 is intended for use with water as the extinguishing fluid and has a filler cap 17. To avoid any possible confusion between the caps 16 and 17, the latter is a small screw-in cap of a size too small to receive a funnel of the kind normally used for feeding oil into the tank 1.

To convey water from the container 15 to the vicinity of the flame in the event of turnover of the heater, the top wall 4 of the tank is apertured at two diametrically opposed points above the container 15. The apertures each receive an adaptor 18 having the form of a bushing for a tube 19. The tube 19 is preferably of copper and has a vertical portion 20 extending through the adaptor 18, a horizontal portion extending radially inwardly of the trough 9 and an upwardly extending portion 22 the upper end of which is slightly above the top of the trough.

The height of the discharge ends of the outlet tubes 19 is chosen so that tilting of the heater on the legs 3 beyond a predetermined angle, whether or not the tilting is followed by a complete turnover of the heater, brings the level of water in the system comprising the container 15 and the tubes 19 above the level of the discharge ends. Water is thus discharged from at least one of the tubes 19 onto the inner side of the inner of the perforated burner shells and extinction of the flame follows in the manner described.

Figure 3:
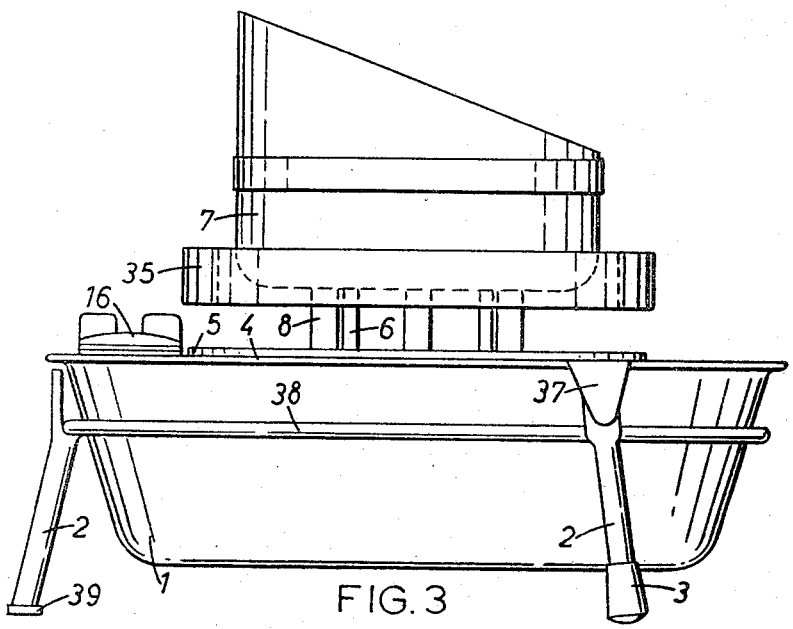
FIGURES 3 and 4 are side and plan views of a second heater embodying the invention.
Figure 4:
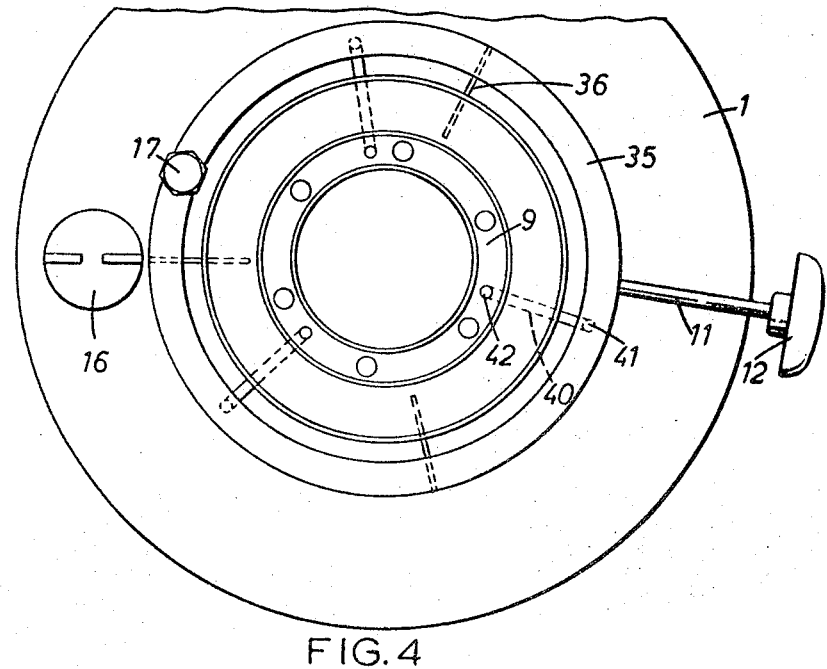
Figure 5:
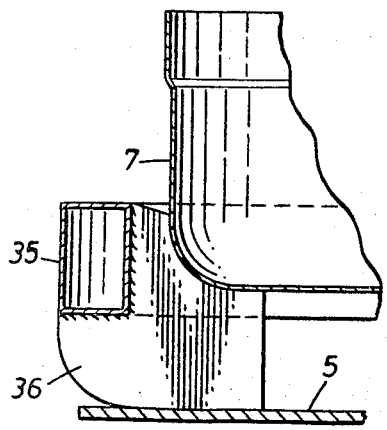
FIGURES 5, 6 and 7 are partial side views corresponding to FIGURE 3 showing details of the second heater.

The embodiment of FIGURES 3–7 is a domestic space heater having essentially the same burner structure as that of the embodiment previously described. Like parts are indicated by like reference numerals in all of FIGURES 1–7. The container 35 for the flame extinguishing material, which again is a liquid, conveniently water, is in the present embodiment however a complete annular tube of rectangular radial cross-section surrounding the base of the draught bowl of the burner structure, being spaced therefrom to limit heat transfer. The mounting means for the container comprises three radially extending plates 36 as shown in FIGURE 5. These plates 36 are welded to the lower and inner sides of the container and engage the base plate 5 and the corner of the draught bowl 7.

The heater is supported by three legs 2 equally angular spaced around the axis of the burner, the legs extending downwardly from brackets 37 secured to the top plate of the fuel tank and from a ring 38 surrounding the tank as shown in FIGURE 3. The two front legs are provided with rubber feet 3 and the rear leg is provided with a floor engaging bracket 39.

Figure 6:
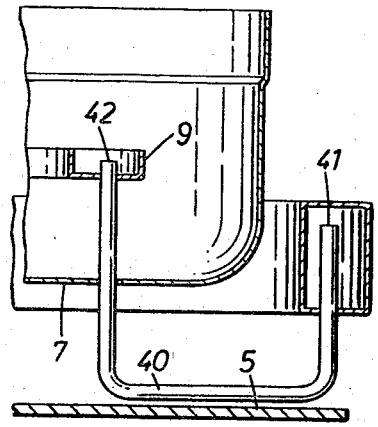
Figure 7:
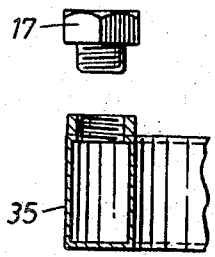

As shown in FIGURES 4 and 6, the tank or container 35 is provided with three outlet pipes 40 which lead down from inlet ends 41 near the top wall of the tank. The pipes horizontally along the base plate 5 and lead upwardly through holes in the floor of the draught bowl 7 and through further holes in the floor of the trough 9. The three outlet pipes 40 have discharge ends 42 just above the floor of the trough. The outlet pipes can comprise ⅛″ diameter copper tubing and the tank can contain about 50 cubic centimetres of water. As shown in FIGURE 7, the tank 35 has a screw-in filler cap 17 as in the previous embodiment.

The angular position of each of the outlet tubes 40 is midway between an adjacent pair of the legs 2. The relative heights of the inlet end 41 and discharge end 41 of the tubes 40 are of course arranged so that water flows from the container into the fuel trough when the heater is tilted through a selected angle.

It will be appreciated that the flame extinguishing system of FIGURES 3–7 is more readily fitted to an existing burner than that of FIGURES 1 and 2 and gives a good head of water, whatever the tilting direction of the tank. Moreover, the water discharges directly into the trough, so effectively damping the wicks 10.

Figure 8:
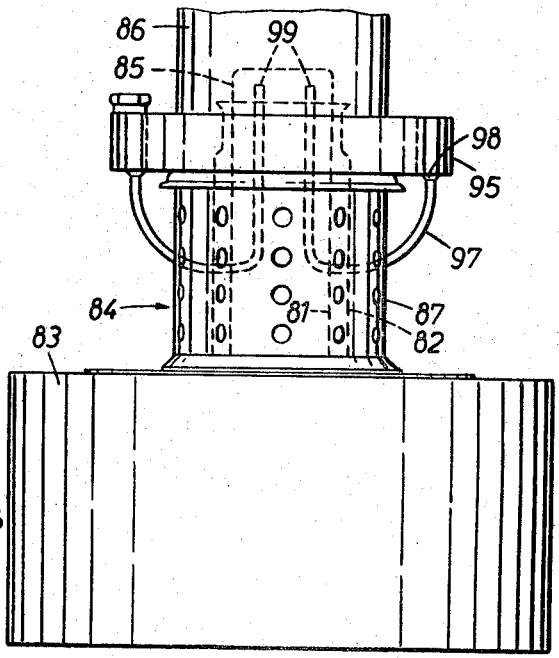
FIGURES 8 and 9 are side and plan views of a third heater embodying the invention.
Figure 9:
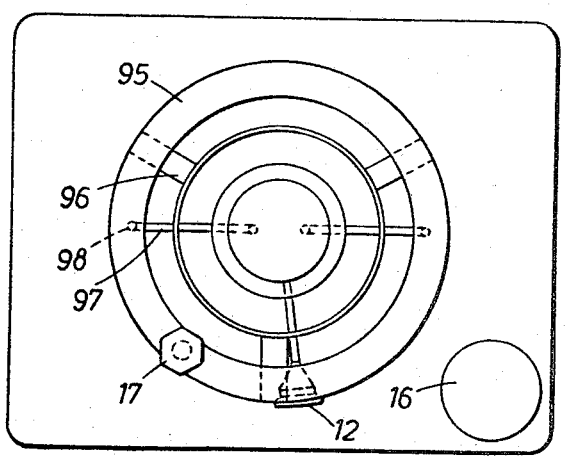

The heater shown in FIGURES 8 and 9 has a different burner structure from that of the embodiments previously described but like parts are again indicated by reference numerals previously used. The burner in the present embodiment has a round or split wick which can be raised and lowered. It consists of two wide strips which are brought together at their upper ends to form a complete ring or of a tubular wick with a V-shaped split. The lower ends of the wick strips extend downwardly through concentric inner and outer wick tubes 81, 82 into a generally rectangular oil container 83 on which the burner structure 84 is mounted. The top of the inner wick tubes 81 is closed by a perforated cap 85. The burner is surrounded by an outer tubular structure comprising a chimney 86 extending upwardly from just below the top of the tubes 81, 82 and a perforated lower portion 87 through which air is drawn upwardly to the combustion zone. The lower end of the chimney portion 86 is slightly spaced from the upper end of the lower portion 87 to allow extra combustion air to be drawn in.

The container or tank for flame extinguishing material again in this embodiment comprises a tubular ring 95 of rectangular cross-section positioned around the burner. The ring 95 is supported on the chimney 86 and is radially spaced therefrom by means of three equi-angularly spaced support brackets 96. The container has two outlet tubes 97 leading to the burner which extend downwardly from inlet ends 98 in the floor or lower wall of the container 95 and are turned inwardly through the tubes 81, 82. This is permitted by the division of the wick into two strips mentioned above. The outlet tubes 97 then turn vertically upwardly so that their discharge ends 99 are just below the cap 85.

As will be evident, tilting of the heater on the base constituted by the fuel tank or reservoir 83 will cause water or other extinguishing liquid to flow from the container 95 through the discharge ends 99 of the outlet tubes 97 into the vicinity of the upper end of the wick, so that the flame supported thereby will be quickly extinguished.

Figure 10:
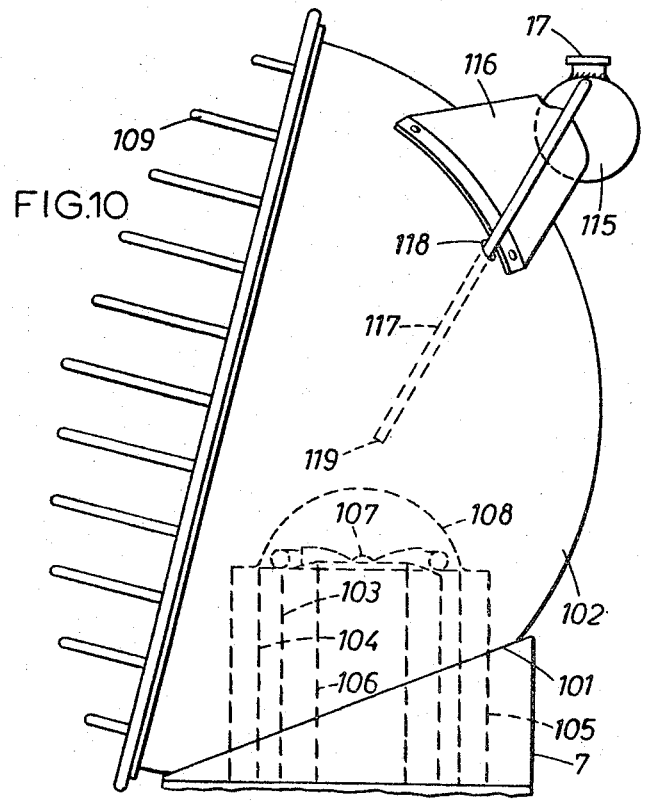
FIGURES 10 and 11 are side and partial rear views of a fourth heater embodying the invention.
Figure 11:
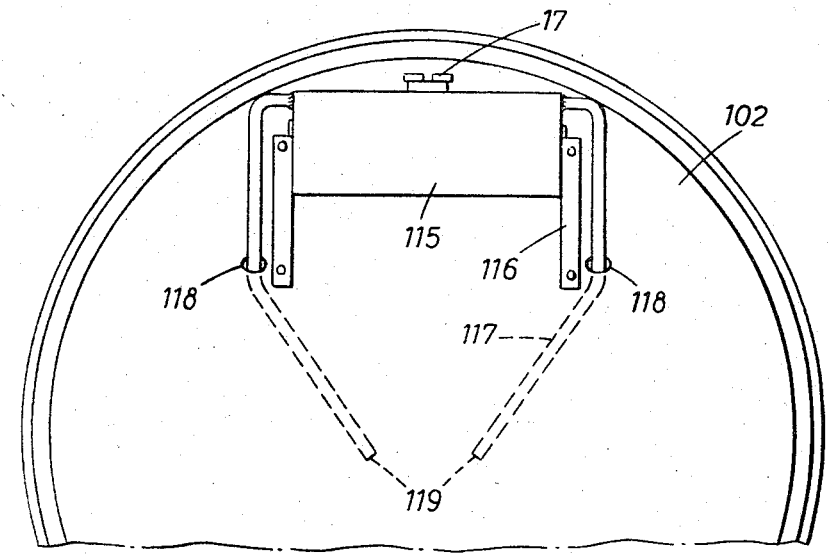

FIGURES 10 and 11 show a domestic space heater of the same general burner construction as the heaters of FIGURES 1–7. The flame extinguishing system of the invention is however mounted above the burner assembly the upper part of which is shown in FIGURE 10. The draught bowl or outer air shield 7 of the burner structure extends to an upper end 101 which lies in an oblique plane, where its edge registers with the edge of an aperture in a part-spherical reflector bowl 102. The upper portion of the burner assembly extends into the bowl 102 and comprise inner and outer concentric tubular burner shells 103, 104 an inner or upper tubular air shield 105 and an inner tube 106 carrying a spreader plate 107. The upper end of the burners is covered by a radiant mantle 108 of wire mesh. Fuel is fed to the combustion chamber between the shells 103, 104 in any suitable way, for example, by the wick arrangement shown in FIGURES 1 and 2. A decorative grill 109 extends across the open front of the bowl 102 to shield the burner assembly from direct contact.

The flame extinction means of FIGURES 10 and 11 comprises a container 115 for the material, which is again conveniently water, the container being mounted above the burner structure at the rear of the reflector bowl 102. The tank or container 115 has a cylindrical form and is secured in place by a bracket 116 at each end so that the tank axis extends horizontally. A screw type filler cap 17 is provided centrally at the top of the container 115 and outlet tubes 117 extend one from the top of each end of the container. The tubes 117 extend downwardly and forwardly through apertures 118 in the reflector bowl 102 and then converge as shown in FIGURE 11. The discharge ends 119 are above the mantle 108.

As with the previous embodiments, it will be clear that a certain degree of tilting of the heater will bring the level of the water in the container 115 to above the inlet ends of the tubes 117 so that the water will be fed onto the burner assembly. The tubes 117 are so arranged that the water discharges from the tube ends 119 as near the centre of the radiant mantle 108 as possible.

It will be appreciated that it is a relatively simple operation to modify an existing heater to incorporate a flame extinguishing system of this kind. The reflector bowl 102 is hingedly connected to the top of the outer air shield 7 and a bowl having the system mounted thereon can readily replace an existing bowl without it.

Figure 13:
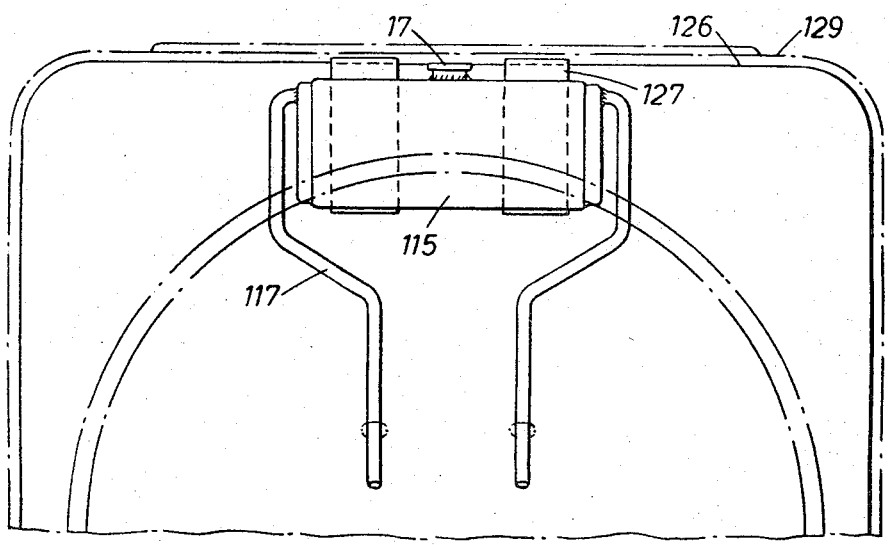
FIGURES 12 and 13 are side and partial rear views of a fifth heater embodying the invention.
Figure 12:
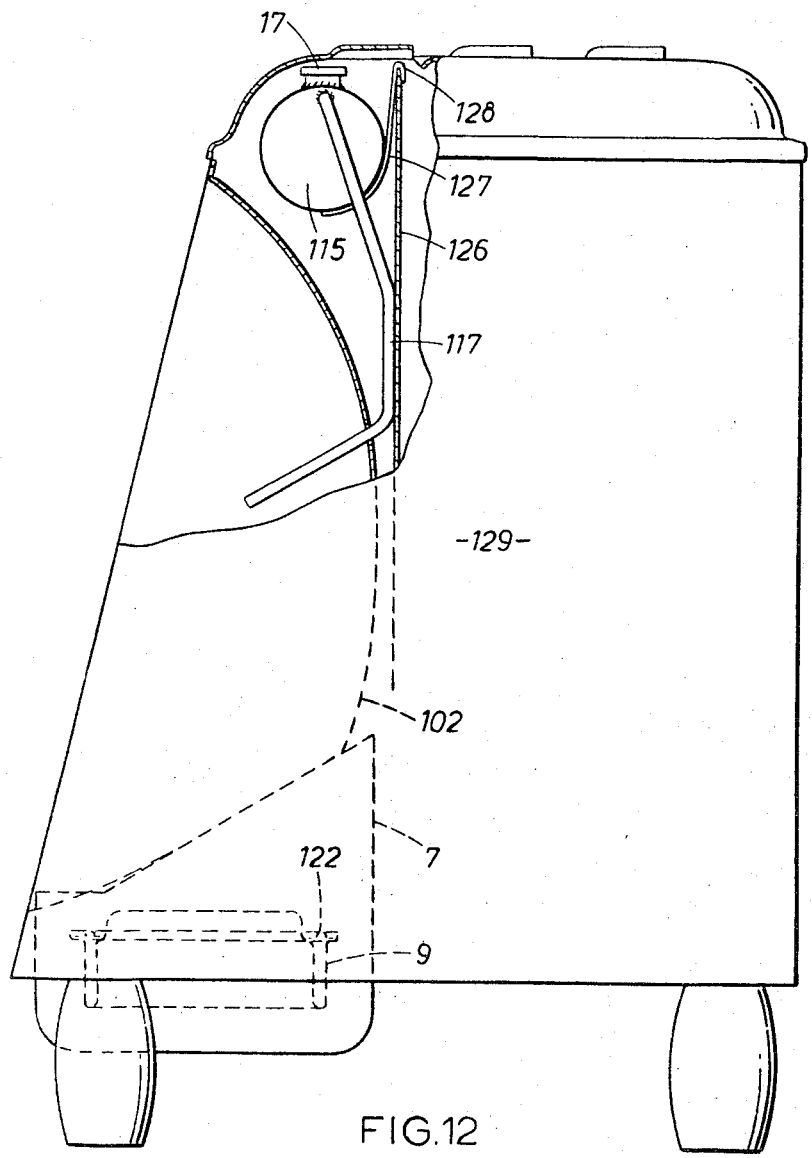

The embodiment of the invention shown in FIGURES 12 and 13 includes flame extinguishing arrangements of the same general kind as those of the previously described embodiment, the heater being however of the so-called drip-feed type. The burner assembly is again of the perforated sleeve or shell type with the burner shells (not shown) resting in an annular trough 9. Fuel is vaporized within the combustion chamber between these shells from a fixed wick or kindler 121 standing the trough, the flame level being adjusted by controlling the feeding of the fuel instead of by raising or lowering the wick. The wick is partly covered by an annular kindler cap 122 resting in the trough. The burner assembly supported from the trough 9 is provided with camming surfaces engageable with internally projecting steps on the draught bowl 7 so that the assembly is slightly rotated as it is put in place, the rotation tightening the burner's shell against the kindler cap 122 to clamp this in place.

The water tank or container 115 is of the same general form as that of the previous embodiment and is similarly located. However, instead of being mounted on the reflector bowl 102, the tank is suspended from a vertical partition 126 at the rear of the bowl by a pair of support brackets 127 having hooked ends 128 which hook over the top of the partition. The partition 126 divides an external housing 129 into a front zone containing the heater and rear zone containing a fuel storage tank. The water outlet tubes are again a pair of copper tubes 117 extending from the top of the ends of the tank 115 downwardly and generally forwardly through apertures 118 in the reflector bowl 102, the discharge ends 117 again being just above the radiant mantle 108. This flame extinguishing system can be readily fitted to an existing heater; its operation will be clear from the previous description.

Figure 14:
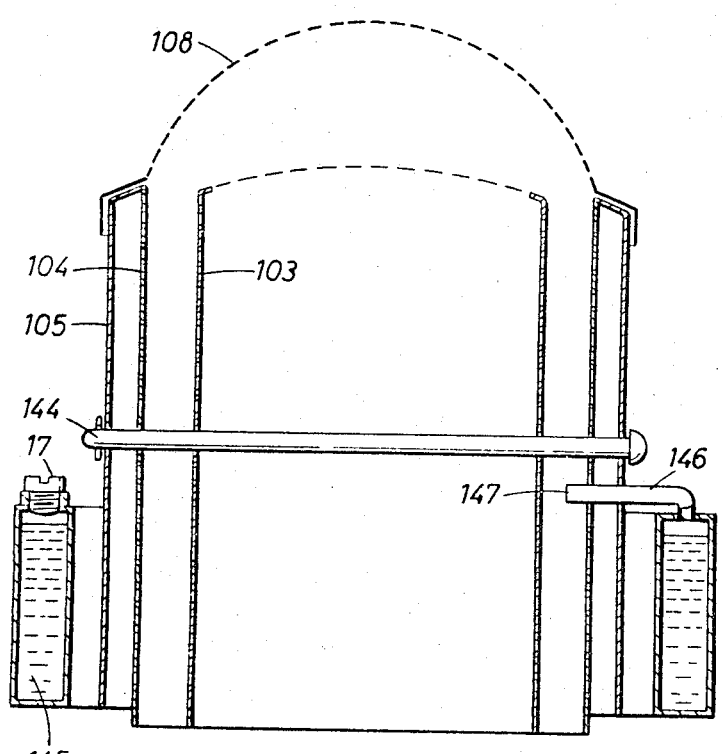
FIGURE 14 is a sectional side view of a burner assembly embodying the invention.

FIGURE 14 shows a burner assembly by which an existing heater of the kind shown in FIGURES 1–7 for example can be modified to incorporate the invention simply by replacement of the burner assembly supported on the fuel trough. The assembly is generally similar to that shown in FIGURE 10 with an upper imperforate air shield 105 around inner and outer perforated burner shells 103, 104. The assembly is held together by one or more rods 144. An annular tank 145 for water or other fluid flame extinguishing material is supported around the air shield 105 by suitable brackets and is radially spaced therefrom. Outlet tubes 146 extend from the top of the tank to discharge ends 147 within the combustion zone defined by the burner shells 103, 104. The operation will be clear from the previous description.

The invention can of course be embodied in a variety of ways other than as described. Thus the heater of FIGURES 12 and 13 can be provided with an upright cylindrical container for an extinguishing fluid with a filter cap at the top and pipes branching out just below the top towards the front of the housing. The pipes lead downwardly and then horizontally below the level of the burner, finally having short upturned portions with ends opening into the base of the trough. The two pipes have their discharge ends at diametrically opposed points of the trough. In such an arrangement, the container can be of transparent material and positioned against a slit in the housing wall so that the level can be readily checked.

However the invention is embodied, the system must be such as to deliver a quantity of water or other flame extinguishing material which is adequate to extinguish the flame, taking into account the size and normal operating temperature of the burner. Where a kindler cap is held down over a kindler the flame can be extinguished with water before any fuel seeps out. Water may vaporize and the steam will assist extinction or effect it on its own. Appliances to which the invention can be applied are frequently constructed so as to be more readily knocked over in one or more directions than in others, as by having three legs, and the flame extinguishing system must of course be arranged to operate promptly and effectively whatever the direction of tilt. The predetermined angle is conveniently large enough for there to be no flame extinction due to inclination at a few degrees to the vertical in normal use.

As previously mentioned, the invention is applicable not only to domestic space heaters but to cookers and to the extinction of the flame of any liquid-fuel burning appliance liable to be tilted so as to be unsafe or knocked over. The invention is thus not restricted by the embodiments described but is limited only by the scope of the following claims.

What is claimed is:

1. In a heating appliance adapted to burn vaporizing liquid fuel, a fuel tank; an enclosed combustion chamber; means for feeding fuel from the fuel tank to the combustion chamber; means for vaporizing fuel for combustion including an element adapted to be heated, incidental to use, to water-flashing temperatures; a water container; conduit means leading from the water container to the combustion chamber and having outlet means thereon, the level of water in said container and the level of the outlet means of said conduit means being such that when the appliance is upright water does not flow from the conduit but when the appliance is tilted to an extent which would permit fuel in the fuel tank to flow into the combustion chamber water will flow by gravity from said container and outlet means against the heated element and be flashed to steam to smother the flames in the combustion chamber.

2. A heating appliance as claimed in claim 1 in which said fuel vaporizing means includes a circular trough and wick means, and two concentric perforated burner shells supported on the trough and defining an annular combustion zone therebetween, at least part of one of said burner shells being said heated element against which the water flows.

3. A heating appliance as claimed in claim 2 wherein the container for water is formed as at least part of a toroid and is mounted concentrically with said burner shells.

4. A heating appliance as claimed in claim 3 wherein the container is set into an upper portion of a fuel tank, said fuel tank having support means for the trough, and the fuel feeding means feeding the fuel from said tank to said trough.

5. A heating appliance as claimed in claim 3 wherein said trough is supported on the fuel tank, the fuel feeding means feeding fuel from said tank to said trough, and said container is disposed at a height between the fuel tank and the trough.

6. A heating appliance as claimed in claim 3 wherein said container is disposed above the level of the trough.

7. A heating appliance as claimed in claim 3 wherein said conduit means comprises a pipe or pipes extending from said container to a position between the burner shells.

8. A heating appliance as claimed in claim 6 wherein the pipe or pipes extend upwardly through the trough.

9. A heating appliance as claimed in claim 3 wherein said outlet means comprises a pipe or pipes extending to a position within the inner burner shell.

10. A heating appliance as claimed in claim 2 wherein said container is mounted above the burner shells and said outlet means comprises a pipe or pipes extending to discharge positions above said shells.

11. A heating appliance as claimed in claim 10 wherein a reflector is provided, and wherein means are provided for mounting said container behind and at the top of said reflector.

12. In a heating appliance adapted to burn vaporizing liquid fuel, a fuel tank; an enclosed combustion chamber including a trough, a pair of concentric sleeves rising from the trough, wick means in the trough, and a structure disposed above the inner sleeve in position to be heated in use to water-flashing temperatures; means for conducting fuel from said tank to said trough; a water container; conduit means leading from the water container and having outlet means, said water container and outlet means being relatively positioned so that when the appliance is upright water will not flow from said outlet means but when the appliance is tilted to an extent which would permit fuel to flow into the combustion chamber water will flow by gravity from the water container and outlet means against said heated structure and be flashed to steam to smother the flames in the combustion chamber.

13. A heating appliance as claimed in claim 12 wherein a chimney member surrounds said concentric sleeves and the container for water is toroidal in form and surrounds said chimney member, and wherein said conduit means comprises a pipe or pipes extending from the container to discharge positions within the inner concentric sleeve for discharge onto said heated metallic structure upon oversetting of the appliance.

References Cited

UNITED STATES PATENTS

| | | | |
|---|---|---|---|
| 169,318 | 10/1875 | Vernon | 67—76 |
| 380,885 | 4/1888 | Greene | 67—76 |
| 734,233 | 7/1903 | Kjaersgaard | 67—76 |
| 815,215 | 3/1906 | Richardson | 67—76 |
| 3,251,395 | 5/1966 | Suma | 158—94 |

FOREIGN PATENTS 7,624    5/1889    Great Britain.

FREDERICK KETTERER, *Primary Examiner.*

U.S. Cl. X.R.

126—96; 431—201, 145